US012732634B2

(12) United States Patent
Chubach et al.

(10) Patent No.: US 12,732,634 B2
(45) Date of Patent: Sep. 8, 2026

(54) METHOD AND APPARATUS FOR PREDICTION BASED ON CROSS COMPONENT LINEAR MODEL IN VIDEO CODING SYSTEM

(71) Applicant: MediaTek Singapore Pte. Ltd., Singapore (SG)

(72) Inventors: Olena Chubach, San Jose, CA (US); Ching-Yeh Chen, Hsinchu City (TW); Tzu-Der Chuang, Hsinchu City (TW); Chun-Chia Chen, Hsinchu City (TW); Man-Shu Chiang, Hsinchu City (TW); Chia-Ming Tsai, Hsinchu City (TW); Yu-Ling Hsiao, Hsinchu City (TW); Chih-Wei Hsu, Hsinchu City (TW); Yu-Wen Huang, Hsinchu City (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 23 days.

(21) Appl. No.: 18/706,340

(22) PCT Filed: Oct. 26, 2022

(86) PCT No.: PCT/CN2022/127566
§ 371 (c)(1),
(2) Date: Apr. 30, 2024

(87) PCT Pub. No.: WO2023/072121
PCT Pub. Date: May 4, 2023

(65) Prior Publication Data

US 2025/0024072 A1 Jan. 16, 2025

Related U.S. Application Data

(60) Provisional application No. 63/274,036, filed on Nov. 1, 2021.

(51) Int. Cl.
*H04N 19/66* (2014.01)
*H04N 19/176* (2014.01)
(Continued)

(52) U.S. Cl.
CPC ......... *H04N 19/593* (2014.11); *H04N 19/176* (2014.11); *H04N 19/186* (2014.11); *H04N 19/80* (2014.11)

(58) Field of Classification Search
CPC .. H04N 19/105; H04N 19/167; H04N 19/176; H04N 19/186; H04N 19/593; H04N 19/80
See application file for complete search history.

(56) References Cited

U.S. PATENT DOCUMENTS 8,724,711 B2 5/2014 Xu
10,154,268 B2 12/2018 Chen
(Continued)

FOREIGN PATENT DOCUMENTS

CN 103650512 A 3/2014
CN 104871537 A 8/2015
(Continued)

OTHER PUBLICATIONS

International Search Report and Written Opinion dated Jan. 17, 2023, issued in application No. PCT/CN2022/127566.
(Continued)

*Primary Examiner* — Md N Haque
(74) *Attorney, Agent, or Firm* — McClure, Qualey & Rodack, LLP

(57) ABSTRACT

A method and apparatus for video coding system that uses intra prediction based on cross-colour linear model are disclosed. According to the method, model parameters for a first-colour predictor model are determined and the first-colour predictor model provides a predicted first-colour
(Continued)

pixel value according to a combination of at least two corresponding reconstructed second-colour pixel values. According to another method, the first-colour predictor model provides a predicted first-colour pixel value based on a second degree model or higher of one or more corresponding reconstructed second-colour pixel values. First-colour predictors for the current first-colour block are determined according to the first-colour prediction model. The input data are then encoded at the encoder side or decoded at the decoder side using the first-colour predictors.

18 Claims, 4 Drawing Sheets

(51) Int. Cl.
*H04N 19/186* (2014.01)
*H04N 19/593* (2014.01)
*H04N 19/80* (2014.01)

(56) References Cited

U.S. PATENT DOCUMENTS 10,237,552 B2 3/2019 Su
10,609,411 B1 3/2020 Cheong
2015/0092850 A1* 4/2015 Talebi Esfandarani ...................... H04N 19/105 375/240.12
2015/0365684 A1* 12/2015 Chen ...................... H04N 19/11 375/240.13
2017/0295366 A1* 10/2017 Chen ...................... H04N 19/59
2021/0136392 A1* 5/2021 Ma ...................... H04N 19/11
2021/0136395 A1* 5/2021 Jun ...................... H04N 19/103
2021/0289215 A1* 9/2021 Helmrich ............. H04N 19/105
2022/0086426 A1* 3/2022 Lee ...................... H04N 19/132
2022/0086428 A1* 3/2022 Lim ...................... H04N 19/105
2022/0150536 A1* 5/2022 Du ...................... H04N 19/593
2025/0047874 A1* 2/2025 Na ...................... H04N 19/50

FOREIGN PATENT DOCUMENTS

CN 107105229 A 8/2017
CN 113396584 A 9/2021

OTHER PUBLICATIONS

Chinese language office action dated Aug. 15, 2023, issued in application No. TW 111141323.

Indian language office action (with English translation) dated Mar. 25, 2026, issued in application No. IN 202427041810.

Li, et al.; "Sub-sampled Cross-component Prediction for Emerging Video Coding Standards;" Dec. 2020; pp. 1-11.

Bross, B., et al.; Overview of the Versatile Video Coding (VVC) Standard and Its Applications; IEEE Transactions on Circuits and Systems for Video Technology; vol. 31; No. 20; Oct. 2021; pp. 3736-3764.

* cited by examiner

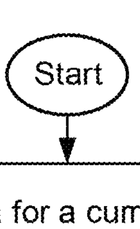

Receiving input data for a current first-colour block to be encoded at an encoder side or associated with the current first-colour block to be decoded at a decoder side — 510

Determining model parameters for a first-colour predictor model, wherein the first-colour predictor model provides a predicted first-colour pixel value based on a second degree model or higher of one or more corresponding reconstructed second-colour pixel values associated with a corresponding second-colour block; and wherein the model parameters are determined based on neighbouring reconstructed second-colour pixels of a collocated second-colour block associated with the current first-colour block and neighbouring reconstructed first-colour pixels of the current first-colour block — 520

Determining first-colour predictors for the current first-colour block, wherein one first-colour predictor value is generated for each first-colour pixel of the current first-colour block by applying the first-colour predictor model to corresponding reconstructed second-colour pixels associated with said each first-colour pixel — 530

Encoding the input data using the first-colour predictors at the encoder side or decoding the input data using the first-colour predictors at the decoder side — 540

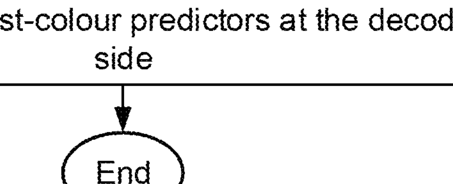

*Fig. 5*

METHOD AND APPARATUS FOR PREDICTION BASED ON CROSS COMPONENT LINEAR MODEL IN VIDEO CODING SYSTEM

CROSS REFERENCE TO RELATED APPLICATIONS

The present invention is a non-Provisional Application of and claims priority to U.S. Provisional Patent Application No. 63/274,036, filed on Nov. 1, 2021. The U.S. Provisional Patent Application is hereby incorporated by reference in its entirety.

FIELD OF THE INVENTION

The present invention relates to video coding system. In particular, the present invention relates to intra prediction using cross-component linear model in a video coding system.

BACKGROUND

Versatile video coding (VVC) is the latest international video coding standard developed by the Joint Video Experts Team (JVET) of the ITU-T Video Coding Experts Group (VCEG) and the ISO/IEC Moving Picture Experts Group (MPEG). The standard has been published as an ISO standard: ISO/IEC 23090-3:2021, Information technology—Coded representation of immersive media—Part 3: Versatile video coding, published February 2021. VVC is developed based on its predecessor HEVC (High Efficiency Video Coding) by adding more coding tools to improve coding efficiency and also to handle various types of video sources including HDR (High Dynamic Range), screen content, 360° video, and spatial scalability video signals.

FIG. 1A illustrates an exemplary adaptive Inter/Intra video coding system incorporating loop processing. For Intra Prediction, the prediction data is derived based on previously coded video data in the current picture. For Inter Prediction 112, Motion Estimation (ME) is performed at the encoder side and Motion Compensation (MC) is performed based of the result of ME to provide prediction data derived from other picture(s) and motion data. Switch 114 selects Intra Prediction 110 or Inter-Prediction 112 and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion and coding modes associated with Intra prediction and Inter prediction, and other information such as parameters associated with loop filters applied to underlying image area. The side information associated with Intra Prediction 110, Inter prediction 112 and in-loop filter 130, are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, in-loop filter 130 is often applied to the reconstructed video data before the reconstructed video data are stored in the Reference Picture Buffer 134 in order to improve video quality. For example, deblocking filter (DF), Sample Adaptive Offset (SAO) and Adaptive Loop Filter (ALF) may be used. The loop filter information may need to be incorporated in the bitstream so that a decoder can properly recover the required information. Therefore, loop filter information is also provided to Entropy Encoder 122 for incorporation into the bitstream. In FIG. 1A, Loop filter 130 is applied to the reconstructed video before the reconstructed samples are stored in the reference picture buffer 134. The system in FIG. 1A is intended to illustrate an exemplary structure of a typical video encoder. It may correspond to the High Efficiency Video Coding (HEVC) system, VP8, VP9, H.264 or VVC.

The decoder, as shown in FIG. 1B, can use similar or portion of the same functional blocks as the encoder except for Transform 118 and Quantization 120 since the decoder only needs Inverse Quantization 124 and Inverse Transform 126. Instead of Entropy Encoder 122, the decoder uses an Entropy Decoder 140 to decode the video bitstream into quantized transform coefficients and needed coding information (e.g. ILPF information, Intra prediction information and Inter prediction information). The Intra prediction 150 at the decoder side does not need to perform the mode search. Instead, the decoder only needs to generate Intra prediction according to Intra prediction information received from the Entropy Decoder 140. Furthermore, for Inter prediction, the decoder only needs to perform motion compensation (MC 152) according to Inter prediction information received from the Entropy Decoder 140 without the need for motion estimation.

According to VVC, an input picture is partitioned into non-overlapped square block regions referred as CTUs (Coding Tree Units), similar to HEVC. Each CTU can be partitioned into one or multiple smaller size coding units (CUs). The resulting CU partitions can be in square or rectangular shapes. Also, VVC divides a CTU into prediction units (PUS) as a unit to apply prediction process, such as Inter prediction, Intra prediction, etc.

The VVC standard incorporates various new coding tools to further improve the coding efficiency over the HEVC standard. Among various new coding tools, some have been adopted by the standard and some are not. Among the new coding tools, a technique, named CCLM (Cross Component Linear Model) has been adopted. The CCLM is briefly reviewed as follows.

CCLM (Cross Component Linear Model)

The main idea behind CCLM mode (sometimes abbreviated as LM mode) is that some correlation often exists among colour components (e.g., Y/Cb/CR, YUV and RGB) of colour pictures. These colours may be referred as first colour, second colour and third colour in this disclosure. CCLM technique exploits the correlation by predicting the chroma components of a block from the collocated reconstructed luma samples by linear models whose parameters are derived from already reconstructed luma and chroma samples that are adjacent to the block.

In VVC, the CCLM mode makes use of inter-channel dependencies by predicting the chroma samples from reconstructed luma samples. This prediction is carried out using a linear model in the form $$P(i, j) = a \cdot rec'_L(i, j) + b. \quad (1)$$

Here, P(i,j) represents the predicted chroma samples in a CU and $rec_L'(i,j)$ represents the reconstructed luma samples of the same CU which are down-sampled for the case of non-4:4:4 colour format. The model parameters a and b are derived based on reconstructed neighbouring luma and chroma samples at both encoder and decoder side without explicit signalling.

Three CCLM modes, i.e., CCLM_LT, CCLM_L, and CCLM_T, are specified in VVC. These three modes differ with respect to the locations of the reference samples that are used for model parameter derivation. Samples only from the top boundary are involved in the CCLM_T mode and samples only from the left boundary are involved in the CCLM_L mode. In the CCLM_LT mode, samples from both the top boundary and the left boundary are used.

Overall, the prediction process of CCLM modes consists of three steps:

1) Down-sampling of the luma block and its neighbouring reconstructed samples to match the size of corresponding chroma block,
2) Model parameter derivation based on reconstructed neighbouring samples, and
3) Applying the model equation (1) to generate the chroma intra prediction samples.

Down-sampling of the Luma Component: To match the chroma sample locations for 4:2:0 or 4:2:2: colour format video sequences, two types of down-sampling filter can be applied to luma samples, both of which have a 2-to-1 down-sampling ratio in the horizontal and vertical directions. These two filters correspond to "type-0" and "type-2" 4:2:0 chroma format content, respectively and are given by $$f_1 = \begin{pmatrix} 0 & 1 & 0 \\ 1 & 4 & 1 \\ 0 & 1 & 0 \end{pmatrix}, \quad (2)$$

$$f_2 = \begin{pmatrix} 1 & 2 & 1 \\ 1 & 2 & 1 \end{pmatrix}.$$

Based on the SPS-level flag information, the 2-dimensional 6-tap (i.e., $f_2$) or 5-tap (i.e., $f_1$) filter is applied to the luma samples within the current block as well as its neighbouring luma samples. The SPS-level refers to Sequence Parameter Set level. An exception happens if the top line of the current block is a CTU boundary. In this case, the one-dimensional filter [1, 2, 1]/4 is applied to the above neighboring luma samples in order to avoid the usage of more than one luma line above the CTU boundary.

Model Parameter Derivation Process: The model parameters a and b from eqn. (1) are derived based on reconstructed neighbouring luma and chroma samples at both encoder and decoder sides to avoid the need for any signalling overhead. In the initially adopted version of the CCLM mode, the linear minimum mean square error (LMMSE) estimator was used for derivation of the parameters. In the final design, however, only four samples are involved to reduce the computational complexity. FIG. 2 shows the relative sample locations of W×H chroma block 210, the corresponding 2W×2H luma block 220 and their neighbouring samples (shown as filled circles and triangles) of "type-0" content.

In the example of FIG. 2, the four samples used in the CCLM_LT mode are shown, which are marked by triangular shape. They are located at the positions of M/4 and M·¾ at the top boundary and at the positions of N/4 and N·¾ at the left boundary. In CCLM_T and CCLM_L modes, the top and left boundary are extended to a size of (M+N) samples, and the four samples used for the model parameter derivation are located at the positions (M+N)/8, (M+N)·⅜, (M+N)·⅝, and (M+N)·⅞.

Once the four samples are selected, four comparison operations are used to determine the two smallest and the two largest luma sample values among them. Let $X_l$ denote the average of the two largest luma sample values and let $X_s$ denote the average of the two smallest luma sample values. Similarly, let $Y_l$ and $Y_s$ denote the averages of the corresponding chroma sample values. Then, the linear model parameters are obtained according to the following equation:

$$a = \frac{Y_l - Y_s}{X_l - X_s} \quad (3)$$

$$b = Y_{s-a} \cdot X_s.$$

In this equation, the division operation to calculate the parameter a is implemented with a look-up table. To reduce the memory required for storing this table, the diff value, which is the difference between the maximum and minimum values, and the parameter a are expressed by an exponential notation. Here, the value of diff is approximated with a 4-bit significant part and an exponent. Consequently, the table for 1/diff only consists of 16 elements. This has the benefit of both reducing the complexity of the calculation and decreasing the memory size required for storing the tables.

The CCLM intra prediction has shown noticeable improvement in coding gain. It is desirable to develop techniques to further improve the efficiency of CCLM and/or techniques to simplify the process while reserving the coding efficiency.

BRIEF SUMMARY OF THE INVENTION

A method and apparatus for video coding system that uses intra prediction based on cross-colour linear model are disclosed. According to the method, input data for a current first-colour block to be encoded at an encoder side or associated with the current first-colour block to be decoded at a decoder side are received. In some embodiments, the input data comprise pixel data for a current first-colour block to be encoded at an encoder side or prediction residual data associated with the current first-colour block to be decoded at a decoder side. Model parameters for a first-colour predictor model are determined, where the first-colour predictor model provides a predicted first-colour pixel value according to a combination of at least two corresponding reconstructed second-colour pixel values associated with a corresponding second-colour block and the model parameters are determined based on neighbouring reconstructed second-colour pixels of a collocated second-colour block associated with the current first-colour block and neighbouring reconstructed first-colour pixels of the current first-colour block. First-colour predictors for the current first-colour block are determined, where one first-colour predictor value is generated for each first-colour pixel of the current first-colour block by applying the first-colour predictor model to corresponding reconstructed second-colour pixels associated with said each first-colour pixel. The input data are then encoded using the first-colour predictors at the encoder side or the input data are decoded using the first-colour predictors at the decoder side.

In one embodiment, said at least two corresponding reconstructed second-colour pixel values correspond to M×N reconstructed second-colour samples, M and N are positive integers and M×N is greater than or equal to 1. For example, M is equal to 3 and N is equal to 2. In another example, M is equal to 2 and N is equal to 2.

In one embodiment, the predicted first-colour pixel value is provided according to a linear combination of said at least two corresponding reconstructed second-colour pixel values. In another embodiment, the predicted first-colour pixel value is provided using operations comprising a non-linear operation on said at least two corresponding reconstructed second-colour pixel values. The non-linear operation may comprise clipping, Min, Max or a combination thereof.

In one embodiment, a final predicted first-colour pixel value is generated as a fusion of the predicted first-colour pixel value and a second predicted first-colour pixel value, where the second predicted first-colour pixel value is generated using a normal intra mode for the current first-colour block.

In one embodiment, when the collocated second-colour block and the current first-colour block have different sampling ratios, multiple-phase filters are used to generate said at least two corresponding reconstructed second-colour pixel values. In one embodiment, selection of the predefined multiple functions or formulas can be determined at different coding levels.

In one embodiment, the neighbouring reconstructed second-colour pixels are from one or more top neighbouring lines and/or one or more left neighbouring lines of the collocated second-colour block, and the neighbouring reconstructed first-colour pixels are from one or more top lines and/or one or more left lines of the current first-colour block.

Another method and apparatus for video coding system that uses intra prediction based on cross-colour linear model are also disclosed. According to this method, the first-colour predictor model provides a predicted first-colour pixel value based on a second degree model or higher of one or more corresponding reconstructed second-colour pixel values. In one embodiment, the predicted first-colour pixel value provided corresponds to a second degree model of one corresponding reconstructed second-colour pixel value.

BRIEF DESCRIPTION OF THE DRAWINGS

FIG. 5 illustrates a flowchart of an exemplary video coding system that utilizes cross-colour linear model according to an embodiment of the present invention, where a second degree model or higher of one or more corresponding reconstructed luma pixel values are used to determine a chroma predictor.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to "one embodiment," "an embodiment," or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

As mentioned earlier, the CCLM coding tool as adopted by the VVC has shown noticeable coding efficiency improvement. It is desirable to develop techniques to further improve the coding gain.

Model Between Luma and Chroma

In one embodiment, M×N filter shape can be used to define parameters of the linear model used for CCLM. Compared with the conventional linear model where the prediction is based on a single reconstructed luma value, $rec_L'(i,j)$ as shown in eqn. (1), the present invention derives the chroma prediction based on M×N reconstructed luma samples. In one embodiment, M=N=2, meaning that there are 5 unknown variables in the equation of the linear model and the equation will look as follows:

$$ch = ay0 + by1 + cy2 + dy3 + e. \tag{4}$$

Figure 3:
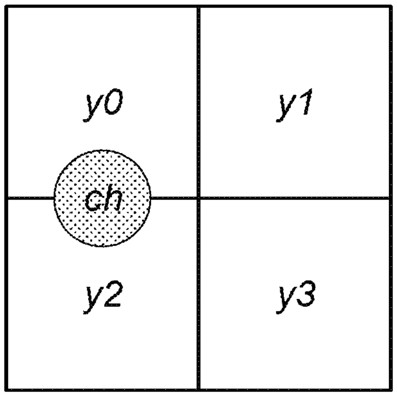
FIG. 3 illustrates an example of a chroma sample location ch between luma samples y0 and y2, and the involved luma samples are marked with y0, y1, y2, and y3.

In FIG. 3, a position (or location) of the chroma sample ch is between luma samples y0 and y2, and the involved luma samples are marked with y0, y1, y2, and y3. Eqn. (4) represents an example of chroma prediction based on a linear model, where ch is generated as a linear combination of y0, y1, y2, and y3. Eqn. (4) has a form of linear filter, where ch corresponds to the output of a linear filter applied to y0, y1, y2, and y3. Accordingly, the model between luma and chroma according to the present invention is also referred as M×N filter shape.

In one embodiment, in case of a 1×2 filter, an equation for luma and chroma is as follows:

$$ch = ay0 + by2 + c. \tag{5}$$

In another embodiment, in case of a 3×2 filter, an equation for luma and chroma is as follows:

$$ch = ay0 + by1 + cy2 + dy3 + ey4 + fy5 + g. \tag{6}$$

In this case, for defining all parameters of the linear model, one would need accessing 7 chroma samples at least at both encoder and decoder.

In one embodiment, a non-linear operation can be integrated in the equation. For example, clipping, or Min/Max operations can be integrated into the equation.

In one embodiment, a higher degree model is used to predict chroma samples, instead of the linear model. The higher degree model refers to a case that uses a second-order model or higher. In one embodiment, the equation used for chroma is as follows:

$$ch = (ay^2 + by + c). \tag{7}$$

In the current version of the CCLM, the predicted chroma sample P(i,j) is considered as a final predictor, which means there is no additional post-processing applied to further refine the predicted sample value. In one embodiment, a fusion is applied between normal intra mode and predictor obtained using CCLM mode of the current CU, and the result of this fusion is further considered as a predictor. In one embodiment, similar to PDPC (Position-Dependent Prediction Combination) concept, a boundary filter is applied to refine samples at the top and left boundaries of the CU.

In one embodiment, a recursive refinement is applied to the predicted parameters. In one embodiment, the refinement is performed as follows:

1. Define scale a and offset b (or more parameters if needed)
2. Use scale a and offset b to predict neighbouring (from adjacent or not only (more than one adjacent) line) chroma samples
3. If the prediction is not good enough-update parameters/used points and return to Step1
4. Repeat until the desired prediction accuracy is obtained or Max number of steps is reached Since the CCLM model is defined according to only the neighbouring samples, the spatial relationship between the neighbouring CUs and current CUs may not be fully reflected. Therefore, in one embodiment, additional boundary filtering can be applied to the CCLM predictors.

In one embodiment, to improve the quality of prediction, additional neighbouring points of the current CU are used in CCLM. In one embodiment, average value of the adjacent samples is first computed (e.g. for the CCLM_LT mode find the average of samples located at the positions (M/4 and M/2) and (M·3/4 and M) at each boundary, and then do similar thing at the left boundary) and then perform four comparison operations used to determine the two smallest and the two largest luma sample values among them. In one embodiment, samples from two neighbouring top lines and/or two neighbouring left lines can be used in CCLM. In one embodiment, the weighted sum is first computed between the samples at the original positions, and those in the line adjacent to the neighbouring line of the current CU (i.e., one line further from the current CU), and then two Min and two Max sample values are defined among those 4 values. In another embodiment, the number of considered/available for CCLM lines is extended to more than 2.

In one embodiment, the two smallest and two largest luma sample values are determined among all the samples available for CCLM, not only those at certain positions (e.g. adjacent lines to the current CU, or more than one adjacent lines from top and/or left). In another embodiment, more than 4 values are used in Min/Max, for example an additional luma sample at the top left position from the current CU is considered, meaning that the two Min and two Max sample values are defined among 5 instead of 4 positions.

While the above disclosure uses luma and chroma signals as an example to illustrate the cross-component prediction, the present invention is not limited to the luma/chroma colour videos. Instead, the present invention may be allied to other colour formats and/or other colour subsampling rations. The methods mentioned in this disclosure can be adjusted accordingly to be applied to other subsampling ratios and/or colour schemes. In one embodiment, the original 4 (or more points are used) and a different linear regression method (e.g. Theil-Sen Estimation, Ridge Regression) or other regression (step-wise (can go from 4 down to 2), polynomial/higher degree model) are used for defining parameters of the linear/higher degree model.

Corresponding Luma Sample Selection

In the original CCLM design, luma samples from the collocated luma block are used for predicting chroma samples of the current CB and one down-sampling filter is used to generate the corresponding luma samples when luma and chroma sampling ratios are different (e.g. YUV420, YUV422, YUV411).

For YUV420 and YUV422 formats, the luma and chroma samples have different resolutions. Therefore, down-sampling has to be used to derive a corresponding luma sample for each chroma sample. In one embodiment, multiple phases of the filter can be used instead of down-sampling filter (i.e. the one applied to luma for YUV420 case). In one embodiment, instead of down-sampling, one of the original luma samples (y0, y1, y2, or y3) are directly used when defining parameters of the linear model in CCLM.

In one embodiment, non-linear operation is used to select one of the four candidates (i.e., y0, y1, y2, or y3) used for defining parameters of the linear model in CCLM. In one embodiment, one of the following non-linear functions is used:

Max (y0, y1, y2, y3)

Min (y0, y1, y2, y3)

Vote (y0, y1, y2, y3)

In one embodiment, multiple functions/formulas are predefined and certain selection is allowed at different levels.

In one embodiment, model parameters can be derived based on multiple luma blocks, so there will be multiple scales a and multiple offsets b defined from different luma blocks In one embodiment, final scale and offset values are defined as an average of those. In another embodiment, the final scale and offset value are chosen among multiple candidates. In one embodiment, the decision may/must be signalled to the decoder, in another embodiment, the decision procedure can be performed at the decoder, as well as during encoding, meaning that no additional signalling is required.

In one embodiment, scale a and offset b are defined using elements from multiple collocated blocks (e.g. one set of a1 and b1 defined using samples from the collocated luma block, another set of scale a2 and offset b2 defined using samples from the parent block of the collocated luma block; also, if the dual tree is used, it is possible to have multiple collocated luma blocks for the current chroma block, which can be used to derive parameters of the linear model). For example, the algorithm is as follows:

$X_l$ is an averaged value from $X_{l1}$ (from luma block Y1), $X_{l2}$ (from luma block Y2) . . .

$X_s$ is an averaged value from $X_{s1}$ (from luma block Y1), $X_{s2}$ (from luma block Y2), . . .

In one embodiment, the reconstructed luma values used for predicting chroma can be equal to the averaged sum (weighted sum/combination) of the reconstructed samples from multiple collocated luma blocks. In one embodiment, following reconstructed luma blocks can be used for predicting chroma:

luma block Y1: collocated luma block used in the original CCLM algorithm luma block Y2: a down-sampled parent luma block when dual tree is applied, there can be multiple collocated luma blocks In another embodiment, IBC-like approach can be used to find more luma blocks and then blend luma reconstructed neighbouring samples, where IBC (Intra Block Copy) is another coding tool adopted by the VVC standard. In another embodiment, Cb/Cr to Cr/Cb prediction can be performed in addition. For example, when we do Cr prediction, we can use multiple predictions from luma together with another prediction from Cb.

History-Based CCLM

In one embodiment, a history-based approach is incorporated in CCLM. In one embodiment, previously defined (from previous CTU/CU/slice) CCLM parameters are saved to the specially defined table, and then some or all of those parameters are also checked for predicting the current CU, together with the newly defined CCLM parameters prediction. In one embodiment, a separate flag is signalled to indicate whether parameters from the history table or the new ones are chosen. In another embodiment, this selection is made implicitly at the decoder (e.g. by using a boundary smoothness condition).

In one embodiment, the decoder can check history-based approach first and if the result is good enough, the definition of the new model is skipped. In one embodiment, additional signalling (e.g. index of the chosen model) may be required.

Histogram-Based CCLM

In this embodiment, the assumption is that the relation between luma and chroma in real frames is not always linear and thus histogram can more accurately reflect it than just a linear model. In one embodiment, information from the previous frame (e.g. at the collocated region/CTU) can be used for obtaining and/or refining a histogram for luma and chroma. In one embodiment, this information (e.g. histogram) together with e.g. L-shape neighbour for luma and chroma and the decoded luma can be used for predicting chroma samples based on luma information (e.g. histogram) in the current region (CU/CTU).

In one embodiment, to improve the accuracy of the prediction, delta value between histogram transforms is sent (e.g. per CTU) to the decoder. In one embodiment, the histogram transform in the current frame is built only based on the neighbouring L-shape information for luma and chroma, and the additional delta is decoded and added to the "predicted" histogram transform. This way, the histogram transform will be more accurate and result in a better chroma prediction. In one embodiment, one delta for both, Cb/Cr component is transmitted. In one embodiment, additional sign information is sent for the delta for each Cb and Cr component (similar to JCCR (Joint Coding of Chrominance Residuals)). In another embodiment, separate delta is transmitted for each Cb and Cr component.

In one embodiment, in some cases, the CCLM model might not be a linear model. For example, a piece-wise linear model (similar to LMCS) can be used for predicting chroma from luma samples. However, while LMCS is monotonically increasing, the piece-wise linear model for CCLM does not necessarily have to have the same behaviour. In one embodiment, a histogram can be used. For example, the histogram of Y component can be divided into several regions, and for each region a separate CCLM model is calculated and then used for predicting chroma component. In one embodiment, a pivot of the range is defined and then all points within each range are defined using a separate linear model. In one embodiment, if some regions do not have enough samples, a history-based CCLM method proposed above can be combined with the histogram-based method. In one embodiment, more than one neighbouring lines are used for building a histogram, which will result in a more accurate histogram and as a result, a better prediction.

Figure 1A:
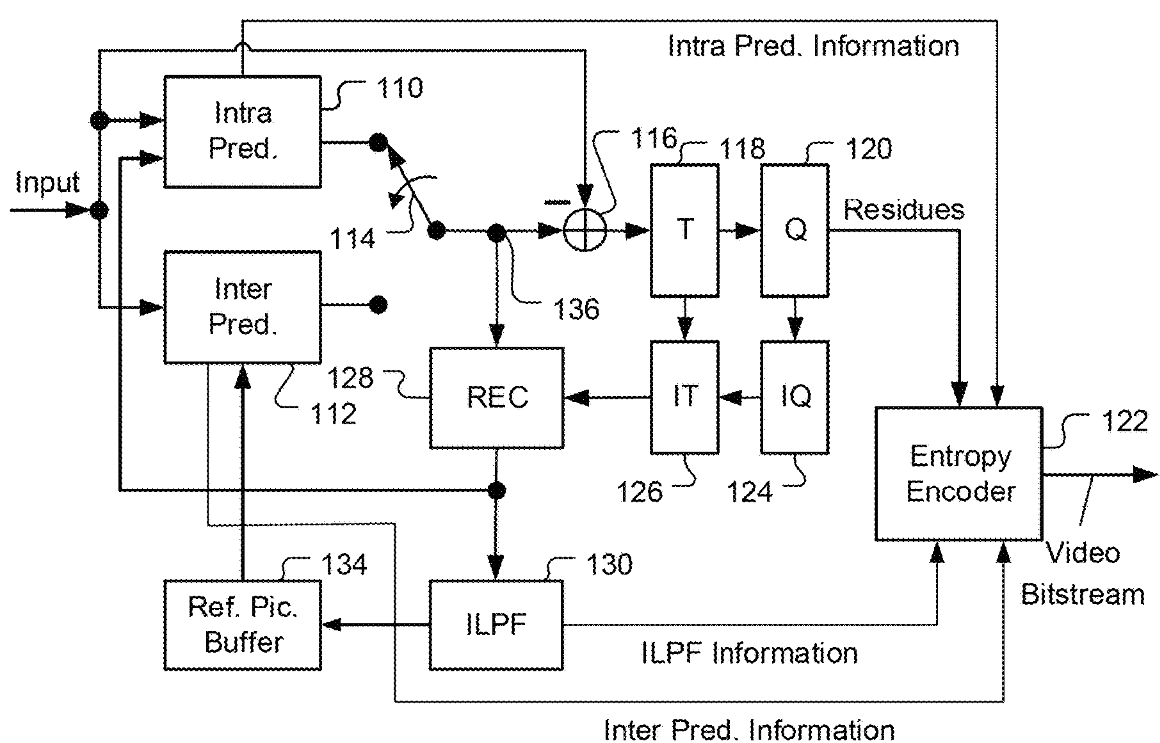
FIG. 1A illustrates an exemplary adaptive Inter/Intra video coding system incorporating loop processing.
Figure 1B:
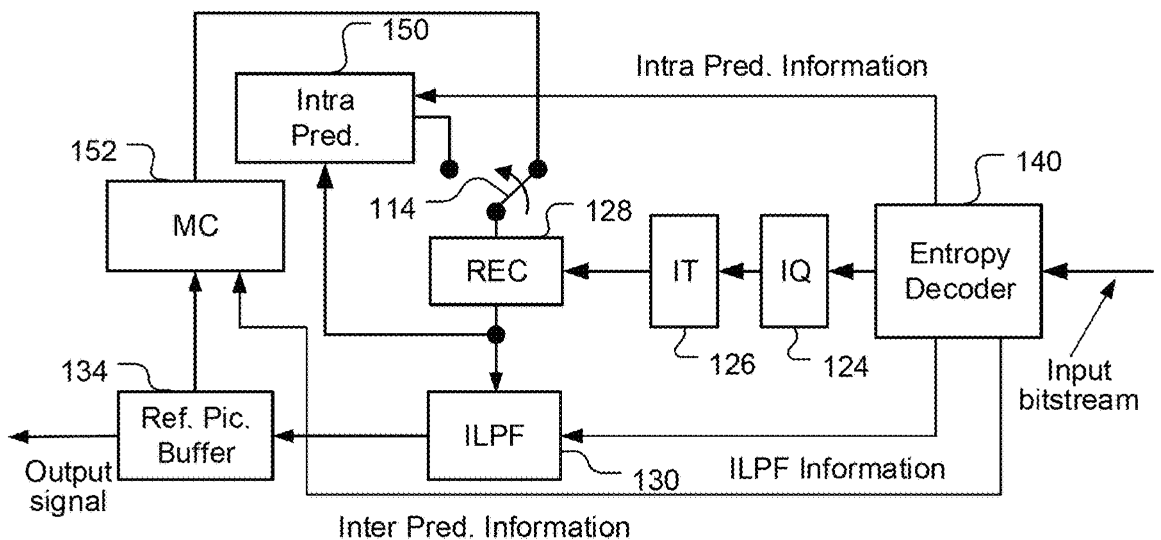
FIG. 1B illustrates a corresponding decoder for the encoder in FIG. 1A.
Figure 2:
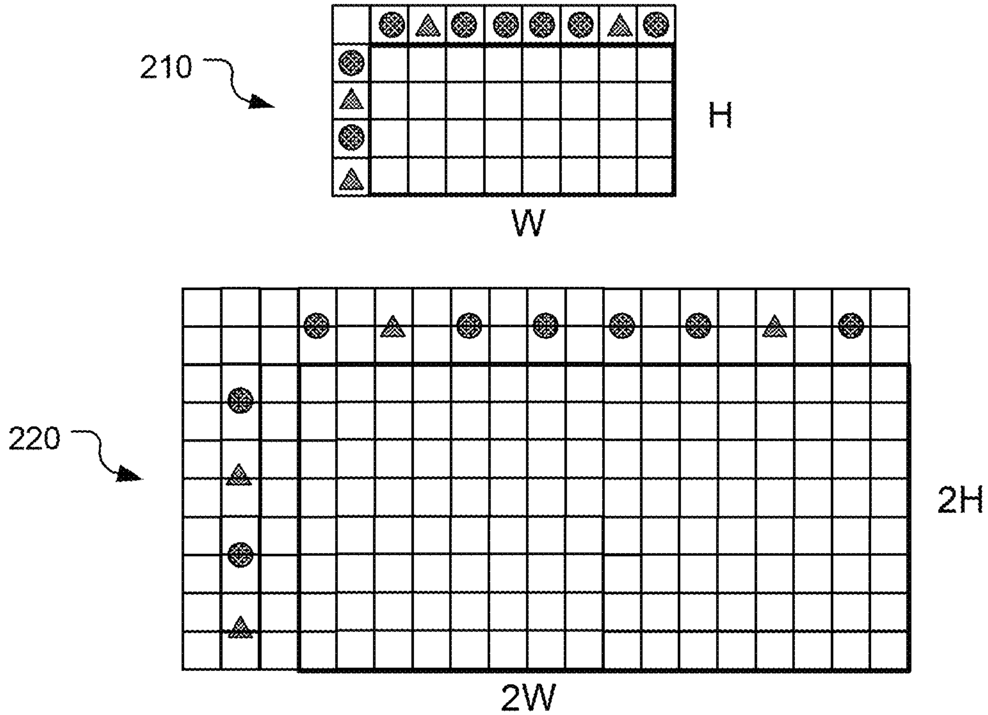
FIG. 2 shows the relative sample locations of W×H chroma block, the corresponding 2W×2H luma block and their neighbouring samples (shown as filled circles and triangles) of "type-0" content.

The CCLM can be used as an intra-prediction technique for intra prediction of chroma components. Therefore, CCLM process is considered as a part of intra prediction. Thus, the foregoing proposed methods related to CCLM can be implemented in the encoders and/or the decoders. For example, the proposed method can be implemented in an intra coding module (e.g. Intra Pred. 110 in FIG. 1A) of an encoder. For another example, the proposed method can be implemented in an intra coding module (e.g. Intra Pred. 150 in FIG. 1B) of a decoder.

Figure 4:
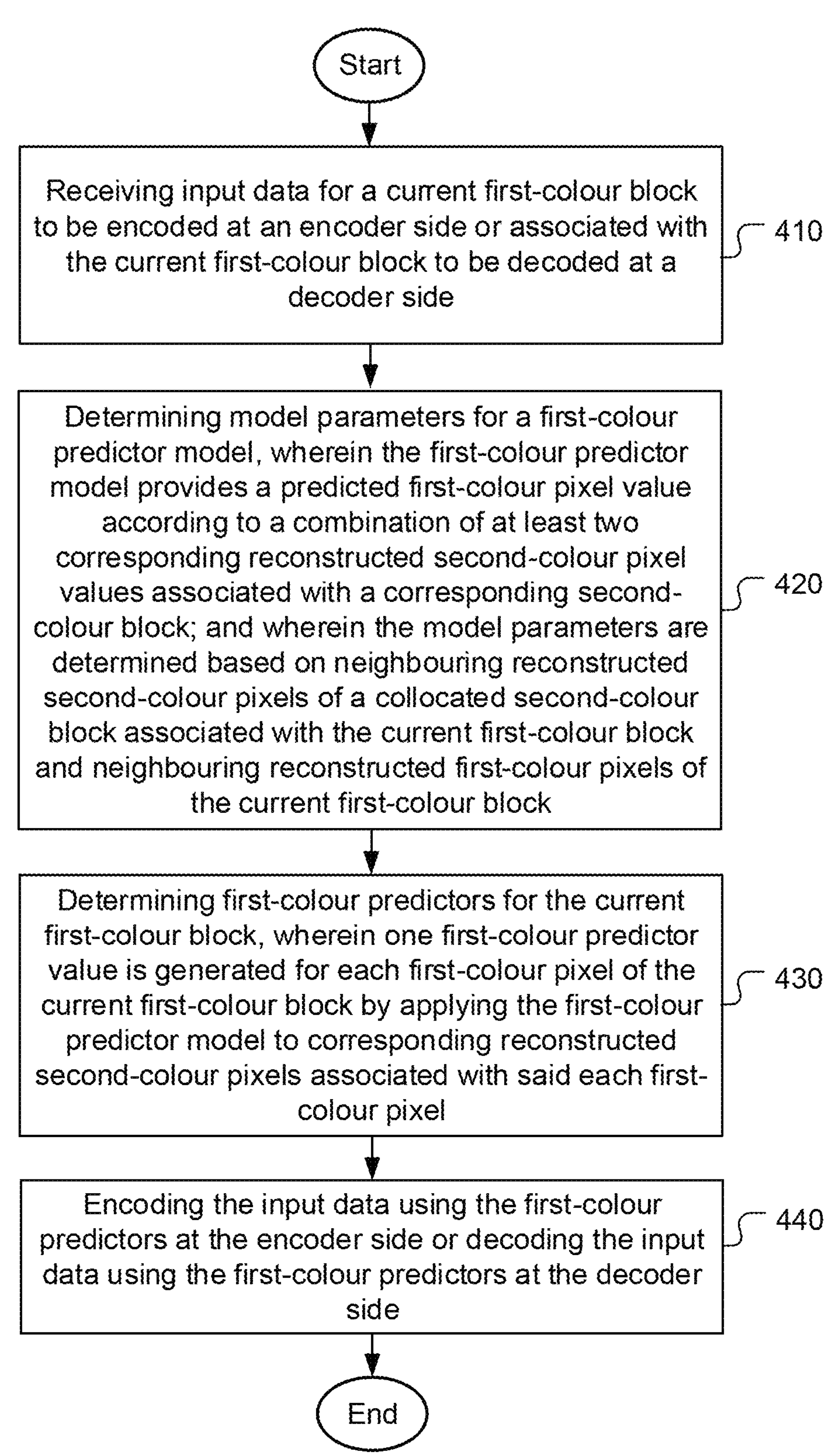
FIG. 4 illustrates a flowchart of an exemplary video coding system that utilizes cross-colour linear model according to an embodiment of the present invention, where at least two corresponding reconstructed luma pixel values are used to determine a chroma predictor.

FIG. 4 illustrates a flowchart of an exemplary video coding system that utilizes cross-colour linear model according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, input data for a current first-colour block to be encoded at an encoder side or associated with the current first-colour block to be decoded at a decoder side are received in step 410. In some embodiments, the input data comprise pixel data for a current first-colour block to be encoded at an encoder side or prediction residual data associated with the current first-colour block to be decoded at a decoder side. Model parameters for a first-colour predictor model are determined in step 420, where the first-colour predictor model provides a predicted first-colour pixel value according to a combination of at least two corresponding reconstructed second-colour pixel values associated with a corresponding second-colour block; and the model parameters are determined based on neighbouring reconstructed second-colour pixels of a collocated second-colour block associated with the current first-colour block and neighbouring reconstructed first-colour pixels of the current first-colour block. First-colour predictors for the current first-colour block are determined in step 430, where one first-colour predictor value is generated for each first-colour pixel of the current first-colour block by applying the first-colour predictor model to corresponding reconstructed second-colour pixels associated with said each first-colour pixel. The input data are then encoded at the encoder side or decoded at the decoder side using the first-colour predictors in step 440.

FIG. 5 illustrates a flowchart of an exemplary video coding system that utilizes cross-colour linear model according to an embodiment of the present invention. According to this method, input data for a current first-colour block to be encoded at an encoder side or associated with the current first-colour block to be decoded at a decoder side are received in step 510. In some embodiments, the input data comprise pixel data for a current first-colour block to be encoded at an encoder side or prediction residual data associated with the current first-colour block to be decoded at a decoder side. Model parameters for a first-colour predictor model are determined in step 520, where the first-colour predictor model provides a predicted first-colour pixel value based on a second degree model or higher of one or more corresponding reconstructed second-colour pixel values associated with a corresponding second-colour block, and the model parameters are determined based on neighbouring reconstructed second-colour pixels of a collocated second-colour block associated with the current first-colour block and neighbouring reconstructed first-colour pixels of the current first-colour block. First-colour predictors for the current first-colour block are determined in step 530, where one first-colour predictor value is generated for each first-colour pixel of the current first-colour block by applying the first-colour predictor model to corresponding reconstructed second-colour pixels associated with said each first-colour pixel. The input data are then encoded at the encoder side or decoded at the decoder side using the first-colour predictors in step 540.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of cross-colour prediction, the method comprising:

receiving input data for a current first-colour block to be encoded at an encoder side or associated with the current first-colour block to be decoded at a decoder side;

determining model parameters for a first-colour predictor model, wherein the first-colour predictor model provides a predicted first-colour pixel value according to a combination of at least two corresponding reconstructed second-colour pixel values associated with a corresponding second-colour block; and wherein the model parameters are determined based on neighbouring reconstructed second-colour pixels of a collocated second-colour block associated with the current first-colour block and neighbouring reconstructed first-colour pixels of the current first-colour block;

determining first-colour predictors for the current first-colour block, wherein one first-colour predictor value is generated for each first-colour pixel of the current first-colour block by applying the first-colour predictor model to corresponding reconstructed second-colour pixels associated with said each first-colour pixel; and encoding the input data using the first-colour predictors at the encoder side or decoding the input data using the first-colour predictors at the decoder side.

2. The method of claim 1, wherein said at least two corresponding reconstructed second-colour pixel values correspond to M×N reconstructed second-colour samples, and wherein M and N are positive integers and M×N is greater than or equal to 2.

3. The method of claim 2, wherein M is equal to 3 and N is equal to 2.

4. The method of claim 2, wherein M is equal to 2 and N is equal to 2.

5. The method of claim 1, wherein the predicted first-colour pixel value is provided according to a linear combination of said at least two corresponding reconstructed second-colour pixel values.

6. The method of claim 1, wherein the predicted first-colour pixel value is provided using operations comprising a non-linear operation on said at least two corresponding reconstructed second-colour pixel values.

7. The method of claim 6, wherein the non-linear operation comprises clipping, Min, Max or a combination thereof.

8. The method of claim 1, wherein a final predicted first-colour pixel value is generated as a fusion of the predicted first-colour pixel value and a second predicted first-colour pixel value, and wherein the second predicted first-colour pixel value is generated using a normal intra mode for the current first-colour block.

9. The method of claim 1, wherein when the collocated second-colour block and the current first-colour block have different sampling ratios, multiple-phase filters are used to generate said at least two corresponding reconstructed second-colour pixel values.

10. The method of claim 9, wherein the multiple-phase filters correspond to predefined multiple functions or formulas.

11. The method of claim 10, wherein selection of the predefined multiple functions or formulas is determined at different coding levels.

12. The method of claim 1, wherein the current first-colour block corresponds to a chroma block and the corresponding second-colour block corresponds to a luma block.

13. The method of claim 1, wherein the neighbouring reconstructed second-colour pixels are from one or more top neighbouring lines and/or one or more left neighbouring lines of the collocated second-colour block, and the neighbouring reconstructed first-colour pixels are from one or more top lines and/or one or more left lines of the current first-colour block.

14. An apparatus for cross-colour prediction, the apparatus comprising one or more electronics or processors arranged to:

receive input data for a current first-colour block to be encoded at an encoder side or associated with the current first-colour block to be decoded at a decoder side;

determine model parameters for a first-colour predictor model, wherein the first-colour predictor model provides a predicted first-colour pixel value according to a combination of at least two corresponding reconstructed second-colour pixel values associated with a corresponding second-colour block; and wherein the model parameters are determined based on neighbouring reconstructed second-colour pixels of a collocated second-colour block associated with the current first-colour block and neighbouring reconstructed first-colour pixels of the current first-colour block;

determine first-colour predictors for the current first-colour block, wherein one first-colour predictor value is generated for each first-colour pixel of the current first-colour block by applying the first-colour predictor model to corresponding reconstructed second-colour pixels associated with said each first-colour pixel; and encode the input data using the first-colour predictors at the encoder side or decode the input data using the first-colour predictors at the decoder side.

15. A method of cross-colour prediction, the method comprising:

receiving input data for a current first-colour block to be encoded at an encoder side or associated with the current first-colour block to be decoded at a decoder side;

determining model parameters for a first-colour predictor model, wherein the first-colour predictor model provides a predicted first-colour pixel value based on a second degree model or higher of one or more corresponding reconstructed second-colour pixel values associated with a corresponding second-colour block; and wherein the model parameters are determined based on neighbouring reconstructed second-colour pixels of a collocated second-colour block associated with the current first-colour block and neighbouring reconstructed first-colour pixels of the current first-colour block;

determining first-colour predictors for the current first-colour block, wherein one first-colour predictor value is generated for each first-colour pixel of the current first-colour block by applying the first-colour predictor model to corresponding reconstructed second-colour pixels associated with said each first-colour pixel; and encoding the input data using the first-colour predictors at the encoder side or decoding the input data using the first-colour predictors at the decoder side.

16. The method of claim 15, wherein the predicted first-colour pixel value provided corresponds to a second degree model of one corresponding reconstructed second-colour pixel value.

17. The method of claim 15, wherein the current first-colour block corresponds to a chroma block and the corresponding second-colour block corresponds to a luma block.

18. An apparatus for cross-colour prediction, the apparatus comprising one or more electronics or processors arranged to:

receive input data for a current first-colour block to be encoded at an encoder side or associated with the current first-colour block to be decoded at a decoder side;

determine model parameters for a first-colour predictor model, wherein the first-colour predictor model provides a predicted first-colour pixel value based on a second degree model or higher of one or more corresponding reconstructed second-colour pixel values associated with a corresponding second-colour block; and wherein the model parameters are determined based on neighbouring reconstructed second-colour pixels of a collocated second-colour block associated with the current first-colour block and neighbouring reconstructed first-colour pixels of the current first-colour block;

determine first-colour predictors for the current first-colour block, wherein one first-colour predictor value is generated for each first-colour pixel of the current first-colour block by applying the first-colour predictor model to corresponding reconstructed second-colour pixels associated with said each first-colour pixel; and encode the input data using the first-colour predictors at the encoder side or decode the input data using the first-colour predictors at the decoder side.

* * * * *